(12) United States Patent
Chen et al.

(10) Patent No.: US 8,089,595 B2
(45) Date of Patent: Jan. 3, 2012

(54) TRANSFLECTIVE LIQUID CRYSTAL DISPLAY DEVICES AND FABRICATION METHODS THEREOF

(75) Inventors: Chung-Hao Chen, Hsinchu County (TW); Chi-Chang Liao, Tainan (TW); Yi-An Sha, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 1208 days.

(21) Appl. No.: 11/521,642

(22) Filed: Sep. 14, 2006

(65) Prior Publication Data

US 2007/0153190 A1    Jul. 5, 2007

(30) Foreign Application Priority Data

Dec. 29, 2005 (TW) .............................. 94147222 A (51) Int. Cl.
*G02F 1/1335* (2006.01)
*G02F 1/1337* (2006.01)
(52) U.S. Cl. ......... 349/129; 349/106; 349/114; 349/128
(58) Field of Classification Search .................. 349/106, 349/114, 128, 129
See application file for complete search history.

(56) References Cited

U.S. PATENT DOCUMENTS

| | | | | |
|---|---|---|---|---|
| 5,953,091 | A * | 9/1999 | Jones et al. | 349/129 |
| 6,798,471 | B2 * | 9/2004 | Yamada | 349/106 |
| 6,812,978 | B2 * | 11/2004 | Kim et al. | 349/106 |
| 6,862,058 | B2 | 3/2005 | Ikeno et al. | |
| 6,900,863 | B2 * | 5/2005 | Okamoto et al. | 349/114 |
| 7,060,420 | B2 * | 6/2006 | Fan et al. | 430/321 |
| 2004/0183971 | A1 | 9/2004 | Fukuchi | |
| 2005/0264730 | A1 | 12/2005 | Kataoka et al. | |

FOREIGN PATENT DOCUMENTS

TW         594287        6/2004

\* cited by examiner

*Primary Examiner* — Mark Robinson
*Assistant Examiner* — Paisley L Arendt (57) ABSTRACT

Transflective liquid crystal displays and fabrication methods thereof. A single gap transflective liquid crystal display includes a first substrate with a reflective region and a transmissive region. A second substrate opposes the first substrate with a gap therebetween. A liquid crystal layer is disposed between the first and second substrates. A color filter is disposed on the first substrate, wherein the color filter is thicker in the transmissive region than in the reflective region, wherein a recess is formed at the reflective region. A first alignment layer is conformally formed on the color filter, forming a second recess in the reflective region. The second recess is filled with a second alignment, wherein the first and second alignment layers provide different orientations and pre-tilt angles for the liquid crystal layer.

14 Claims, 7 Drawing Sheets

TRANSFLECTIVE LIQUID CRYSTAL DISPLAY DEVICES AND FABRICATION METHODS THEREOF

BACKGROUND OF THE INVENTION

1. Field of the Invention

The present invention relates to liquid crystal display (LCD) devices, and in particular to transflective liquid crystal display devices and fabrication methods thereof.

2. Description of the Related Art

Liquid crystal display (LCD) devices have many advantages such as small volume, light weight and low power consumption, and are applicable in a variety of electronic and communication devices including notebook computers, personal digital assistants (PDA), mobile phones and the like due to lighter weight, thinner profile, and increased portability.

A conventional LCD device includes a pair of substrates with opposing electrodes thereon. A liquid crystal layer is interposed between the pair of substrates. An electric field is applied on the opposing electrodes to control liquid crystal molecular orientations in the liquid crystal layer, thereby displaying desirable images. Two alignment layers are separately interposed between the interfaces between the liquid crystal layer and each substrate, providing initial orientations and pre-tilting status for the molecules in the liquid crystal layer.

Conventional transflective LCD devices can take advantage of the ambient light and back light to provide better quality display images. The transmissive mode can enhance the reflective mode in dark environments to improve brightness. The reflective mode can enhance the transmissive mode in bright environments for power conservation as well as overcoming the washout effect. The distance of light travel in the reflective region is twice as long as the distance of light travel in the transmissive region, the cell gap in the reflective region, however, must differ from the cell gap in the transmissive region, resulting in deterioration of LCD performance, such as variation in brightness and color.

Figure 1:
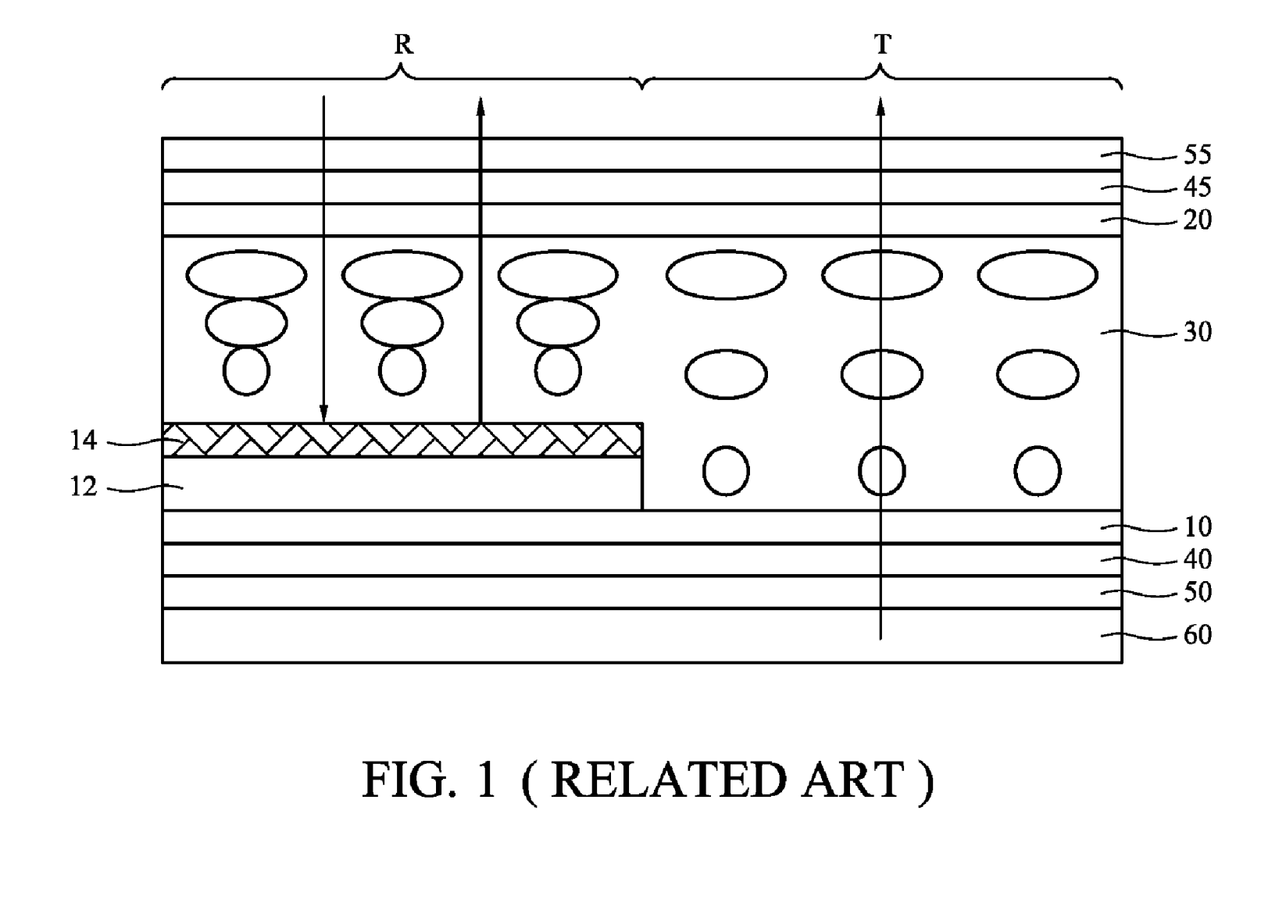
FIG. 1 is a cross section of a conventional transflective LCD device with different alignment layer on the reflective and the transmissive regions respectively.

FIG. 1 is a cross section of a conventional transflective LCD device with different cell gaps on the reflective and the transmissive regions respectively. Referring to FIG. 1, in order to solve problems caused by different light travel distances in the transmissive mode and in the reflective mode, different thicknesses of liquid crystal layers 30 are formed on the transmissive region T and the reflective region R respectively. More specifically, a protrusion structure 12 or a bump is formed on the reflective region R of the lower substrate 10. A reflector 14 is formed on the protrusion structure 12. An upper substrate 20 is disposed opposing the lower substrate 10 with a gap therebetween. Therefore, the liquid crystal layer 30 has a first portion corresponding to the transmissive region T thicker than a second portion corresponding to the reflective region R. By combining with quarter wave plates 40 and 45, phase retardation can be compensated between the transmissive region T and the reflective region R. The quarter wave plates 40 and 45 are disposed on outer surfaces of the upper substrate and the lower substrate respectively. Polarizers 50 and 55 are formed on the quarter wave plates 40 and 45 respectively. A back light unit (BLU) 60 is disposed at the bottom of the transreflective LCD device.

Forming the protrusion structure 12 on the lower substrate 10 and then depositing the reflector 14 on the protrusion structure 12, however, require intricate lithography and deposition procedures, causing high production cost and low yield. It is desirable to overcome these and other problems of the related art and to provide transflective LCD devices including T and R regions with different cell gaps that provide both regions with high light modulation efficiency.

U.S. Pat. No. 6,862,058, the entirety of which is hereby incorporated by reference discloses a single gap transflective LCD device. In each pixel, different alignment layers are formed on the reflective region and the transmissive region respectively to reach the same phase retardation. A vertical alignment layer is formed on an active matrix substrate. A mask layer is disposed on the reflective region, thereby exposing transmissive region under UV radiation. The vertical alignment on the transmissive region is transferred to a horizontal alignment layer. The mask layer is then removed. A rubbing procedure is performed on the vertical alignment layer on the reflective region, while leaving a horizontal alignment layer on the transmissive region.

BRIEF SUMMARY OF THE INVENTION

A detailed description is given in the following embodiments with reference to the accompanying drawings.

Accordingly, a transflective liquid crystal display device having color filters with different thicknesses on the transmissive and reflective regions respectively is provided. A step is formed between a transmissive region and a reflective region, leaving a recess on the reflective region. Different alignment layers are separately formed on the transmissive and reflective regions that provide both regions with balanced brightness and contrast ratio.

According to an embodiment of the invention, a transflective liquid crystal display device comprises: a first substrate with a reflective region and a transmissive region; a second substrate opposing the first substrate with a gap therebetween; a liquid crystal layer interposed between the first and the second substrates; a color filter disposed on the first substrate, wherein the color filter is thicker in the transmissive region than at the reflective region, and wherein a first recess is formed in the reflective region; a first alignment layer conformably disposed on the color filter, wherein a second recess is formed in the reflective region; and a second alignment layer filled the second recess, wherein pre-tilt angles and orientations of liquid crystal molecules on the first alignment layer and on the second alignment layer are different.

According to another embodiment of the invention, a method for fabricating a transflective liquid crystal display device is provided. A first substrate with a reflective region and a transmissive region is provided. A color filter is formed on the first substrate, wherein the color filter is thicker in the transmissive region than at the reflective region, and wherein a first recess is formed in the reflective region. A first alignment layer is conformably formed on the color filter, wherein a second recess is formed in the reflective region. A second alignment layer is formed on the first alignment layer and fills the second recess. A second substrate is assembled opposing the first substrate with a gap therebetween. A liquid crystal layer is filled between the first and the second substrates, wherein pre-tilt angles and orientations of liquid crystal molecules on the first alignment layer and on the second alignment layer are different.

According to another embodiment of the invention, a method for fabricating a liquid crystal display device is provided. A first substrate with a reflective region and a transmissive region is provided. A transparent protrusion is formed on the reflective region of the first substrate. A color filter is formed on the first substrate covering the transparent protrusion, wherein the color filter is thicker in the transmissive region than in the reflective region, and wherein a first recess is formed in the transmissive region. A first alignment layer is conformably formed on the color filter, wherein a second recess is formed in the transmissive region. A second alignment layer is formed on the first alignment layer and fills the second recess. A second substrate is assembled opposing the first substrate with a gap therebetween. A liquid crystal layer is filled between the first and the second substrates, wherein pre-tilt angles and orientations of liquid crystal molecules on the first alignment layer and on the second alignment layer are different.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The invention is directed to a single gap transflective LCD device in which balanced brightness and contrast ratio are exhibited in both the transmissive and reflective regions. Since a substantial recess is created in the reflective region of the color filter substrate due to a thicker color filter portion disposed in the transmissive region, a first and second alignment layers are respectively applied in the transmissive and the reflective regions of the color filter substrate. The invention provides a single gap transflective LC cell including T and R regions with similar retardation changes that provide both regions with high light modulation efficiency, thus use of photolithography to create different alignment layers is unnecessary.

Figure 2A:
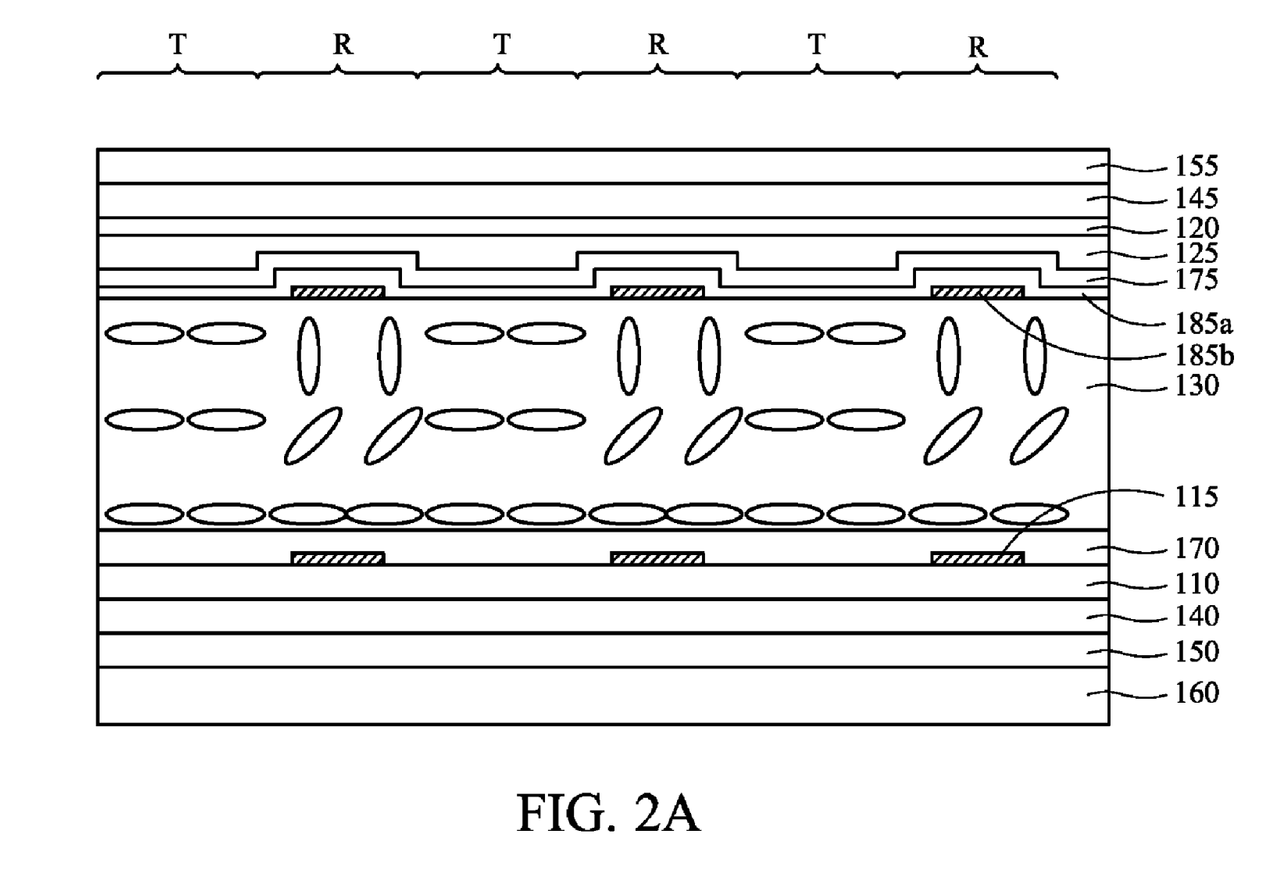
FIGS. 2A-2B are cross sections of transflective LCD devices according to an embodiment of the invention.

FIG. 2A is a cross section of a transflective LCD device according to an embodiment of the invention. A step, formed due to a thicker portion on the transmissive region of a color filter substrate, creates a substantial recess. Different alignment materials are applied respectively on the transmissive and the reflective regions of the color filter substrate, thereby forming similar retardation changes that provide both regions under a single gap transflective LC cell. Referring to FIG. 2A, a lower substrate 110 such as an active matrix substrate is provided. The lower substrate 110 can be divided into a plurality of pixels. Each pixel includes a transmissive region T and a reflective region R. A reflector 115 is formed on the reflective region R of the lower substrate 110. An alignment layer 170 is formed on the lower substrate 110. An upper substrate 120 such as a color filter substrate is disposed opposing the lower substrate 110 with a gap therebetween. A liquid crystal layer 130 is interposed between the lower substrate 110 and the upper substrate 120.

A color filter 125 is disposed on the upper substrate 120. The color filter 125 includes a thicker portion corresponding to the transmissive region T and a thinner portion corresponding to the reflective region R, creating a first recess on the reflective region R. A transparent electrode 175 is formed on the color filter 125. A first alignment layer 185a is conformably formed on the transparent electrode 175, creating a second recess on the reflective region R. A second alignment layer 185b is filled in the second recess, wherein pre-tilt angles and orientations of liquid crystal molecules on the first alignment layer 185a and on the second alignment layer 185b are different.

By combining with quarter wave plates 140 and 145, phase retardation of incident light between the transmissive region T and the reflective region R can be compensated. The quarter wave plates 140 and 145 are disposed on outer surfaces of the upper substrate 120 and the lower substrate 110 respectively. Polarizers 150 and 155 are formed on the quarter wave plates 140 and 145 respectively. A back light unit (BLU) 160 is disposed at the bottom of the transreflective LCD device.

Figure 3:
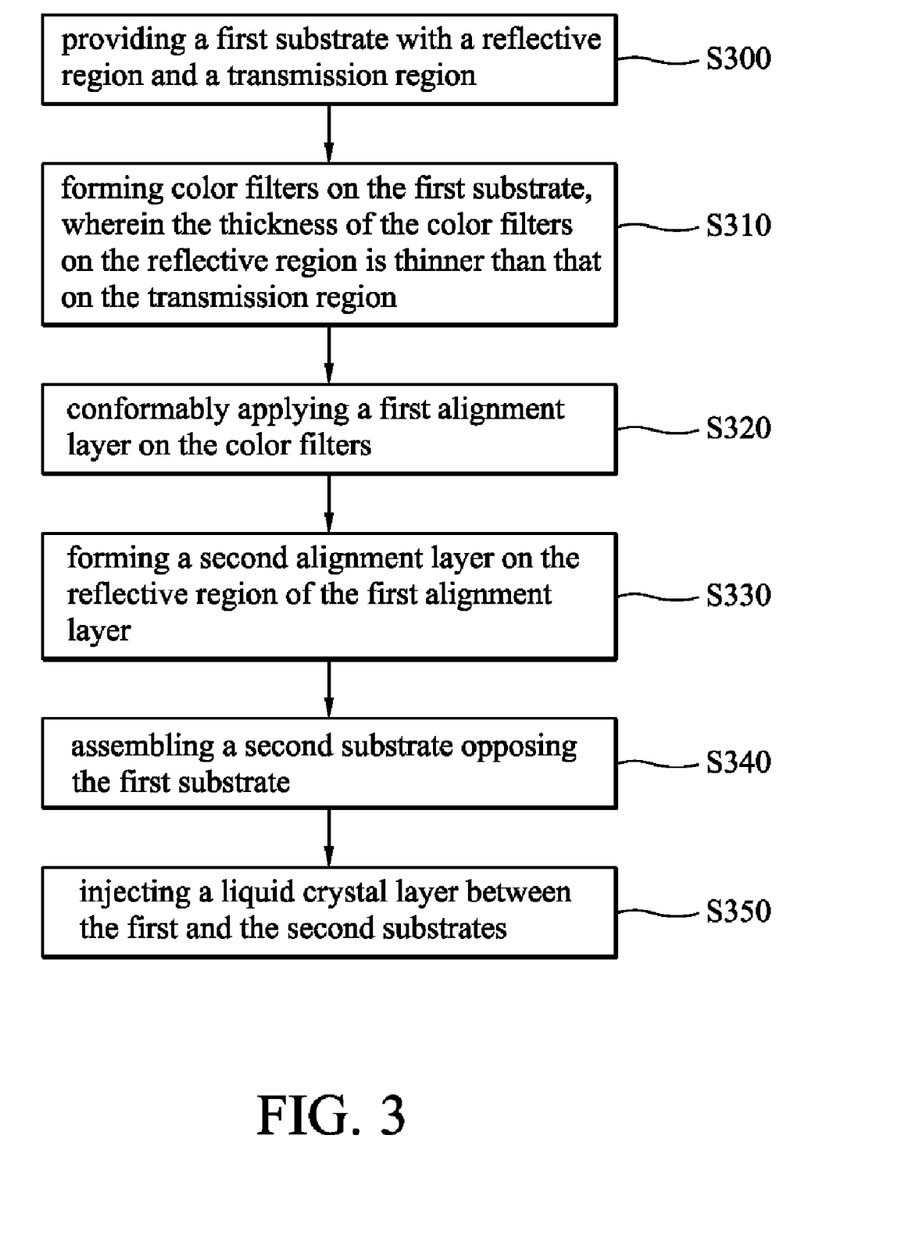
FIG. 3 is a flowchart of fabricating a transflective LCD device according to an embodiment of the invention.

The invention further provides a fabrication method for a transflective LCD device. FIG. 3 is a flowchart of fabricating a transflective LCD device according to an embodiment of the invention. In step S300, a first substrate is provided. The first substrate comprises a plurality of pixels. Each pixel includes a transmissive region and a reflective region. In step S310, a color filter is formed on the first substrate. The color filter includes a thicker portion corresponding to the transmissive region and a thinner portion corresponding to the reflective region, creating a recess on the reflective region. In step S320, a first alignment layer is conformably formed on the first substrate. In step S330, a second alignment layer is inkjet printed on the transmissive region of the first alignment layer and fills the recess.

Next, in step S340, a second substrate such as an active matrix substrate is assembled opposing the first substrate with a gap therebetween. In step S350, a liquid crystal later is interposed between the first and the second substrates.

Figure 4A:
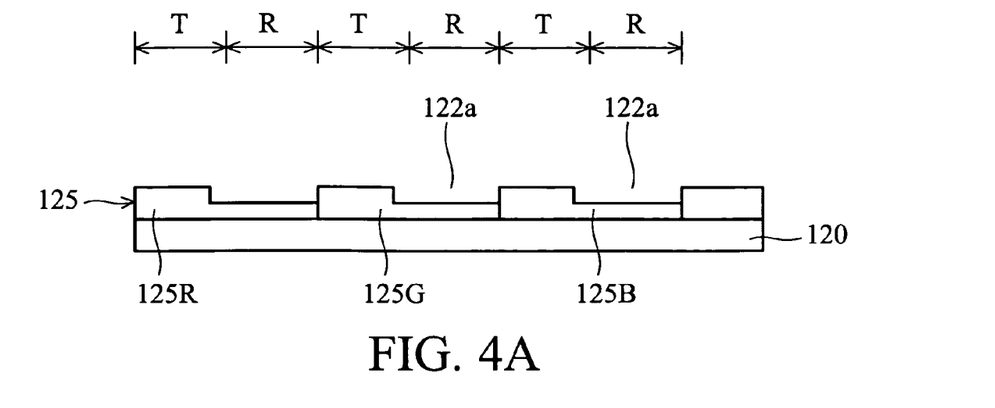
FIGS. 4A-4C are cross sections showing fabrication steps for a color filter substrate structure of a transflective LCD device according to an embodiment of the invention.
Figure 4B:
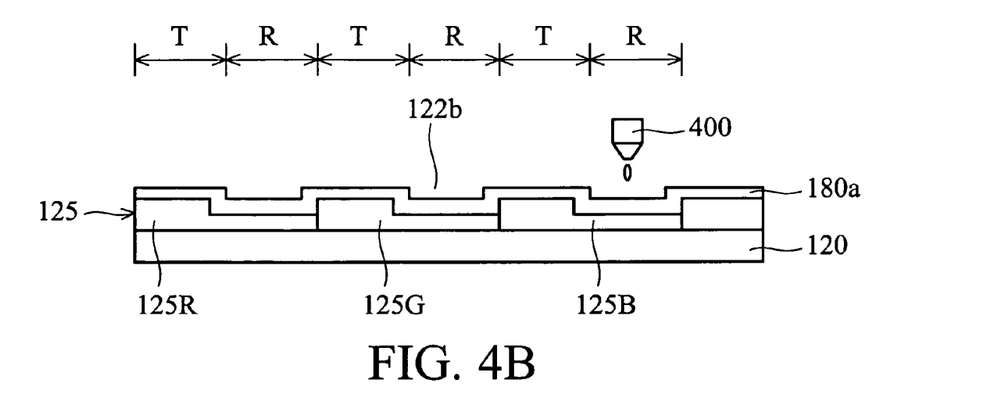
Figure 4C:
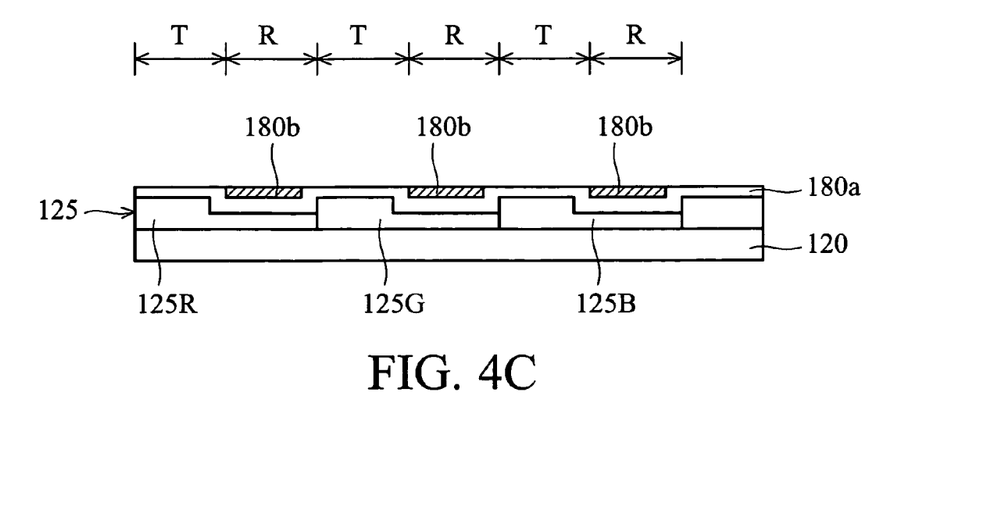

FIGS. 4A-4C are cross sections showing fabrication steps for a color filter substrate structure of a transflective LCD device according to an embodiment of the invention. Referring to FIG. 4A, a substrate 120 such as a glass substrate, or a transparent plastic substrate is provided. The substrate 120 includes a plurality of pixels. Each pixel includes a transmissive region T and a reflective region R. A color filter 125 is disposed on the substrate 120. The color filter 125 includes red 125R, green 125G, and 125B primary color layers. Each color layer has a thicker portion corresponding to the transmissive region T and a thinner portion corresponding to the reflective region R, creating a first recess on the reflective region R, creating a first recess 122a on the reflective region R. The color filter 125 can be formed by lithography, inkjet printing, or other color filter processes to create different thicknesses corresponding to the transmissive region T and the reflective region R, thereby compensating brightness differences and color shift between the transmissive and reflective regions.

Referring FIG. 4B, a first alignment layer 180a is conformably formed on the color filter 125 and a second recess 122b is formed on the reflective region R. After the first alignment layer 180a is formed on the color filter 125, a soft baking procedure and a hard baking procedure are performed on the first alignment layer. For example, the first alignment layer 180a can be formed by roller coating, spin coating, spraying, or inkjet printing on the color filter 125. The material of the first alignment layer preferably comprises polyvinyl alcohol (PVA), polyimide (PI), polyamide (PA), polyurea (PU), nylon, or lecithin. Next, a second alignment layer 180b is formed on the reflective region R of the first alignment layer 180a and fills the second recess 122b. After the second alignment layer 180b is formed on the first alignment layer 180a, a soft baking procedure and a hard baking procedure are performed on the second alignment layer 180b. For example, the second alignment layer 180b is formed by spraying or inkjet printing on the first alignment layer 180a and fills the second recess 122b. More specifically, a polyimide (PI) layer is formed by inkjet printing on the recess 122b of the first alignment layer 180a. A fluid injector 400, such as a thermal bubble driven inkjet printhead or a piezoelectric diaphragm driven inkjet printhead, can inject droplets of alignment material into the second recess 122b. The material of the second alignment layer 180b preferably comprises polyvinyl alcohol (PVA), polyimide (PI), polyamide (PA), polyurea (PU), nylon, or lecithin.

Referring to FIG. 4C, after a baking procedure at 180° C., the first and second alignment layers 180a and 180b are performed by rubbing aligning, photo aligning, plasma aligning, or ion-beam aligning to provide different initial orientations and pre-tilt angles for the liquid crystal molecules respectively. Next, an opposing substrate (not shown) such as an active matrix substrate is assembled opposing the substrate 120 with a gap therebetween. A liquid crystal later is interposed between the first and the second substrates, thus fabrication of a transflective LCD device is completed as shown in FIG. 2A.

Note that the material of the first alignment layer 180a is selected to have different polarities from the second alignment layer 180b. For example, if the first alignment layer 180a is hydrophilic, the second alignment layer 180b is hydrophobic. Therefore, the surface tension of liquid crystal molecules on the first alignment layer 180a is substantially different from that on the second alignment layer 180b.

Figure 2B:
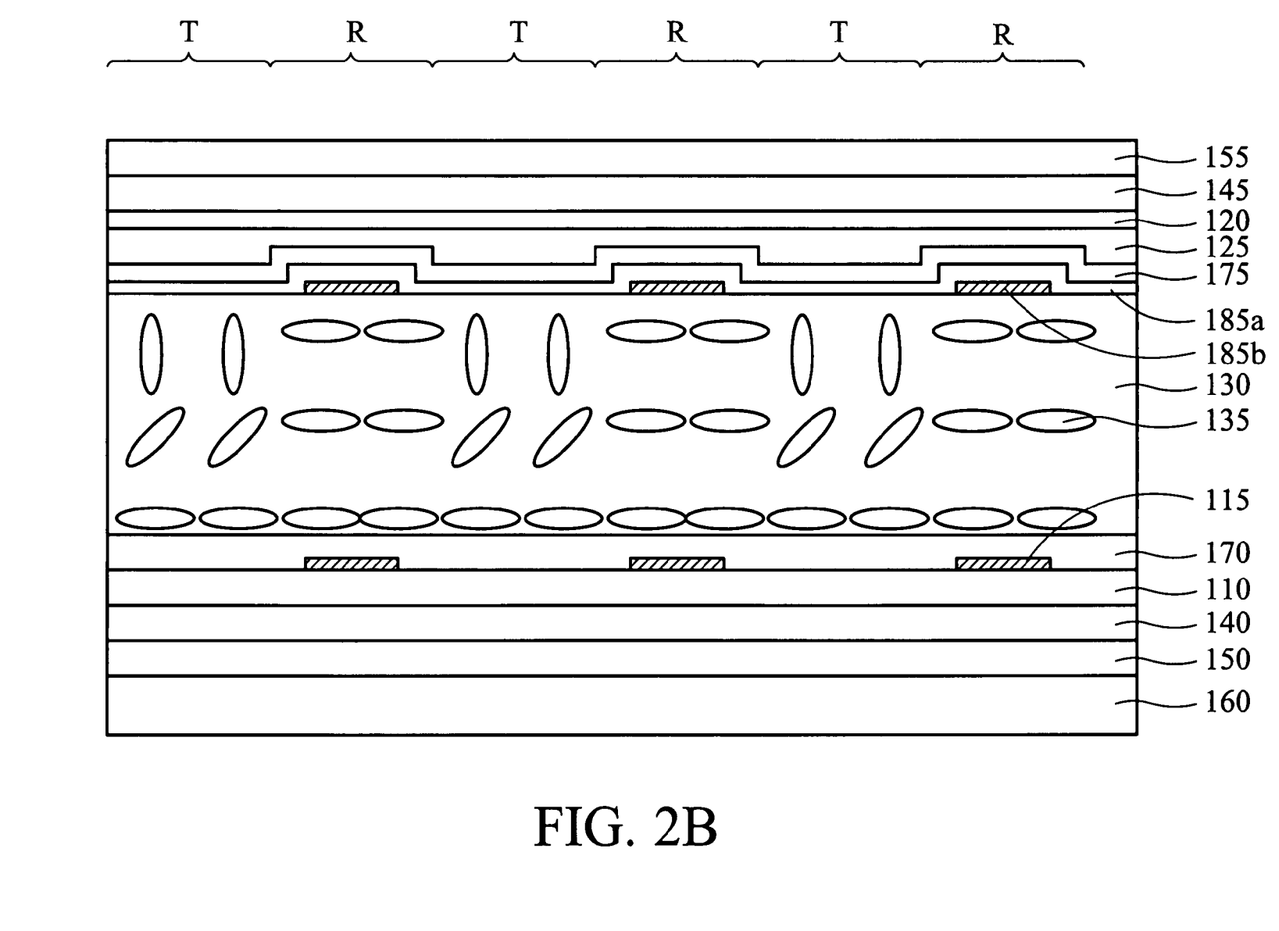

Accordingly, the first alignment layer 180a preferably provides a vertical liquid crystal molecule orientation, i.e., a longitudinal axis of the liquid crystal molecule is pre-tilted 75-90 degrees against the first alignment layer 180a, while the second alignment layer 180b provides a horizontal liquid crystal molecule orientation, i.e., a longitudinal axis of the liquid crystal molecule is pre-tilted 0-15 degrees against the second alignment layer 180b, as shown in FIG. 2B. Alternatively, the first alignment layer 180a provides a horizontal liquid crystal molecule orientation, i.e., a longitudinal axis of the liquid crystal molecule is pre-tilted 0-15 degrees against the first alignment layer 180a, while the second alignment layer 180b provides a vertical liquid crystal molecule orientation, i.e., a longitudinal axis of the liquid crystal molecule is pre-tilted 75-90 degrees against the second alignment layer 180b, as shown in FIG. 2A.

Figure 5A:
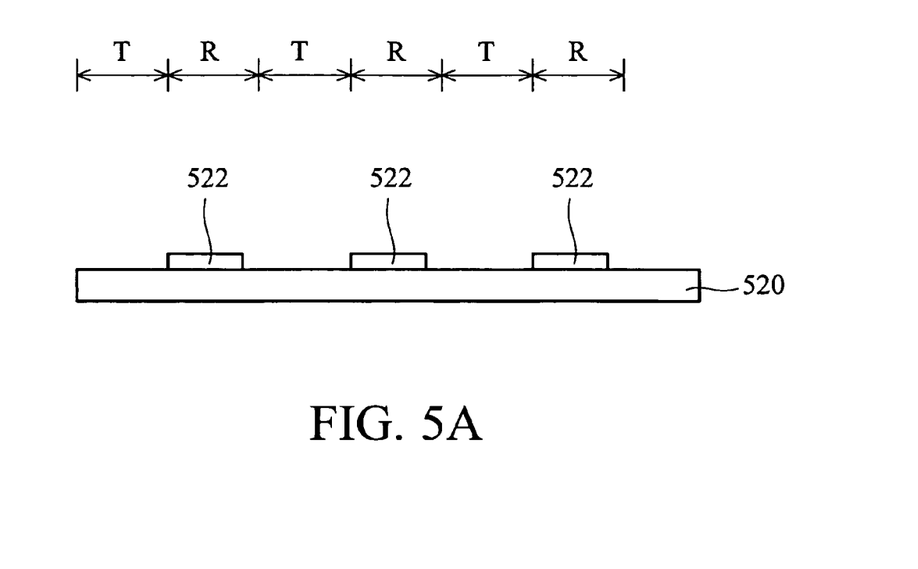
FIGS. 5A-5D are cross sections showing fabrication steps for a color filter substrate structure of a transflective LCD device according to another embodiment of the invention.

FIGS. 5A-5D are cross sections showing fabrication steps for a color filter substrate structure of a transflective LCD device according to another embodiment of the invention. Referring to FIG. 5A, a substrate 520 such as a glass substrate, or a transparent plastic substrate is provided. The substrate 520 can be an active matrix substrate with a plurality of pixels. Each pixel includes a transmissive region T and a reflective region R. A transparent protrusion 522 or a bump is formed on the reflective region R of the substrate 520.

Figure 5B:
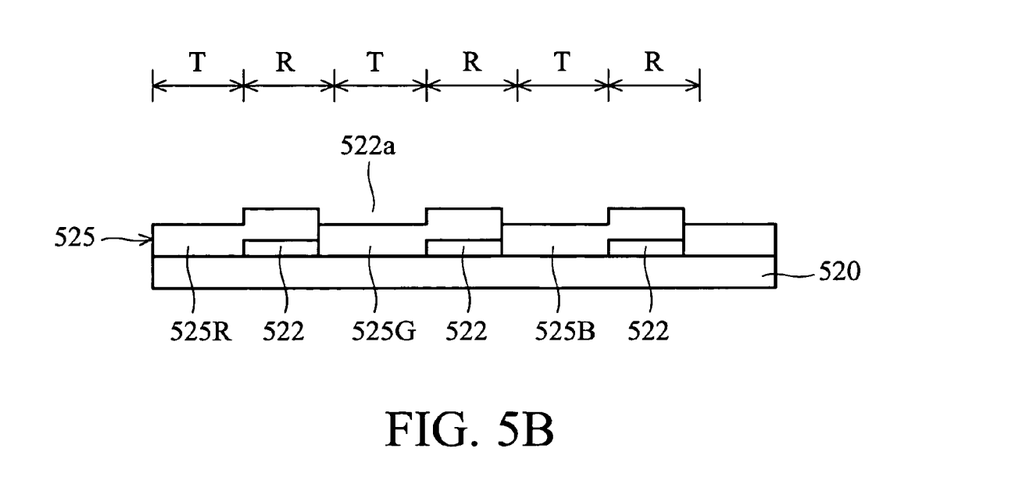

Referring to FIG. 5B, a color filter 525 is disposed on the substrate 520. The color filter 525 includes red 525R, green 525G, and 525B primary color layers. Each color layer has a thicker portion corresponding to the transmissive region T and a thinner portion corresponding to the reflective region R, creating a first recess 522a on the transmissive region T. The color filter 525 can be formed by lithography, inkjet printing, or other color filter processes to create different thicknesses corresponding to the transmissive region T and the reflective region R, thereby compensating brightness differences and color shift between the transmissive and reflective regions.

Figure 5C:
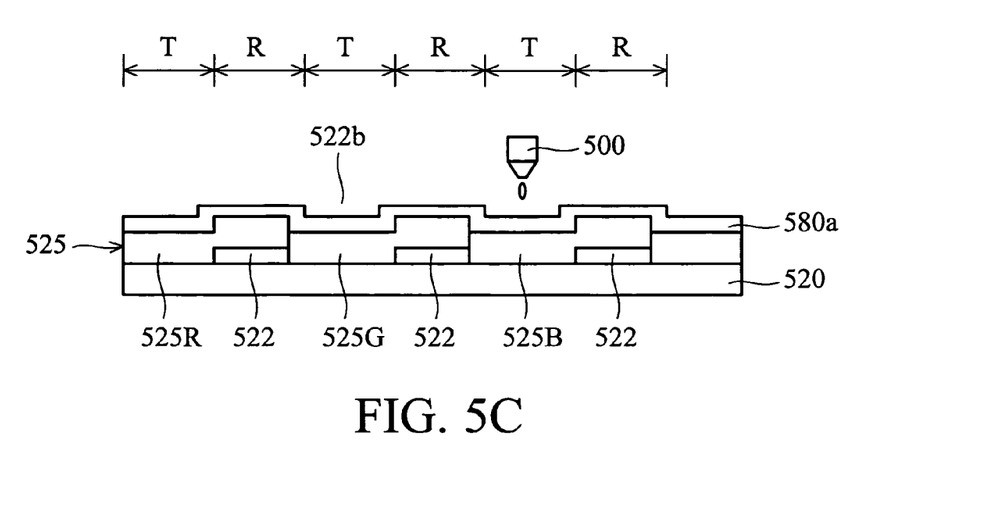

Referring FIG. 5C, a first alignment layer 580a is conformably formed on the color filter 525 and a second recess 522b is formed on the transmissive region T. After the first alignment layer 580a is formed on the color filter 525, a soft baking procedure and a hard baking procedure are performed on the first alignment layer 580a. For example, the first alignment layer 580a can be formed by roller coating, spin coating, spraying, or inkjet printing on the color filter 525. The material of the first alignment layer 580a preferably comprises polyvinyl alcohol (PVA), polyimide (PI), polyamide (PA), polyurea (PU), nylon, or lecithin.

Next, a second alignment layer 580b is formed on the transmissive region T of the first alignment layer 580a and fills the second recess 522b. After the second alignment layer 580b is formed on the first alignment layer 580a, a soft baking procedure and a hard baking procedure are performed on the second alignment layer 580b. For example, the second alignment layer 580b is formed by spraying or inkjet printing on the first alignment layer 580a and fills the second recess 522b. More specifically, a polyimide (PI) layer is formed by inkjet printing on the recess 522b of the first alignment layer 580a. A fluid injector 500, such as a thermal bubble driven inkjet printhead or a piezoelectric diaphragm driven inkjet printhead, can inject droplets of alignment material into the second recess 522b. The material of the second alignment layer 180b preferably comprises polyvinyl alcohol (PVA), polyimide (PI), polyamide (PA), polyurea (PU), nylon, or lecithin.

Figure 5D:
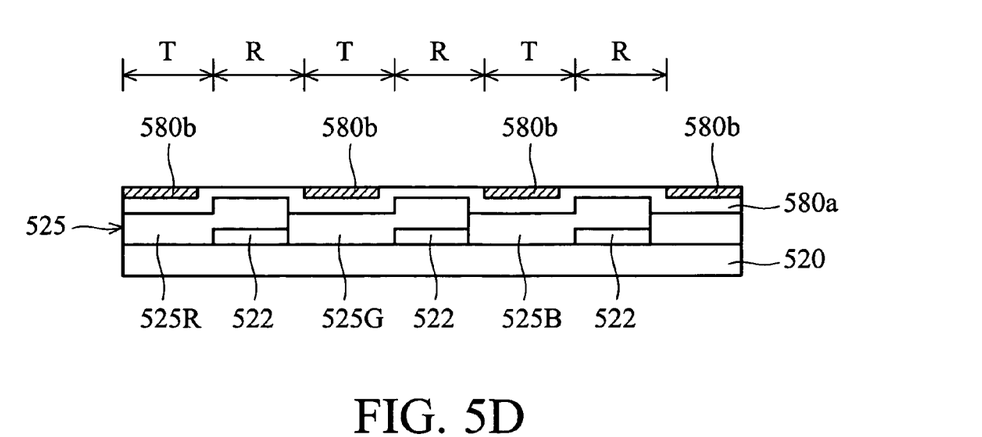

Referring to FIG. 5D, after a baking procedure at 180° C., the first and second alignment layers 580a and 580b are performed by rubbing aligning, photo aligning, plasma aligning, or ion-beam aligning to provide different initial orientations and pre-tilt angles for the liquid crystal molecules respectively. Next, an opposing substrate (not shown) such as an active matrix substrate is assembled opposing the substrate 520 with a gap therebetween. A liquid crystal later is interposed between the first and the second substrates, thus fabrication of a transflective LCD device is completed The invention is advantageous in that different alignment layers are respectively formed on the transmissive region and the reflective region of a transflective liquid crystal display device in which alignment orientations of liquid crystal molecules on the first and second alignment layers are different. The invention provides a single gap transflective LC cell including T and R regions with similar retardation changes that provide both regions with high light modulation efficiency, thus use of photolithography to create different alignment layers is unnecessary.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A transflective liquid crystal display device, comprising:
   a first substrate with a reflective region and a transmissive region;
   a second substrate opposing the first substrate with a gap therebetween;

a liquid crystal layer interposed between the first and the second substrates;

a color filter disposed on the first substrate, wherein the color filter is thicker in the transmissive region than at the reflective region, and wherein a first recess is formed in the reflective region;

a first alignment layer conformably disposed on the color filter, wherein a second recess is formed in the first alignment layer at the reflective region and faces toward the liquid crystal layer; and a second alignment layer filled in the second recess without contacting a surface of the first alignment layer outside of the second recess to provide a single gap transflective liquid crystal cell;

wherein a material of the first alignment layer and a material of the second alignment layer have different polarities such that pre-tilt angles and orientations of liquid crystal molecules on the reflective region and on the transmissive region are different.

2. The transflective liquid crystal display device as claimed in claim 1, wherein a polarity of the first alignment layer is opposite to the polarity of the second alignment layer.

3. The transflective liquid crystal display device as claimed in claim 1, wherein the first alignment layer and the second alignment layer comprise polyvinyl alcohol (PVA), polyimide (PI), polyamide (PA), polyurea (PU), nylon, or lecithin.

4. The transflective liquid crystal display device as claimed in claim 1, wherein the first alignment layer provides a vertically liquid crystal molecule orientation, wherein a longitudinal axis of the liquid crystal molecule is pre-tilted 75-90 degrees against the first alignment layer; and wherein the second alignment layer provides a horizontally liquid crystal molecule orientation, wherein a longitudinal axis of the liquid crystal molecule is pre-tilted 0-15 degrees against the second alignment layer.

5. The transflective liquid crystal display device as claimed in claim 1, wherein the first alignment layer provides a horizontally liquid crystal molecule orientation, wherein a longitudinal axis of the liquid crystal molecule is pre-tilted 0-15 degrees against the first alignment layer; and wherein the second alignment layer provides a vertically liquid crystal molecule orientation, wherein a longitudinal axis of the liquid crystal molecule is pre-tilted 75-90 degrees against the second alignment layer.

6. The transflective liquid crystal display device as claimed in claim 1, further comprising a transparent electrode interposed between the color filter and the first alignment layer.

7. A method for fabricating a transflective liquid crystal display device, comprising:

providing a first substrate with a reflective region and a transmissive region;

forming a color filter on the first substrate, wherein the color filter is thicker in the transmissive region than in the reflective region, and wherein a first recess is formed in the reflective region;

conformably forming a first alignment layer on the color filter, wherein a second recess is formed in the first alignment layer in the reflective region and faces toward the liquid crystal layer;

forming a second alignment layer on the first alignment layer and filling the second recess without contacting a surface of the first alignment layer outside of the second recess to provide a single gap transflective liquid crystal cell;

assembling a second substrate opposing the first substrate with a gap therebetween; and filling a liquid crystal layer between the first and the second substrates;

wherein a material of the first alignment layer and a material of the second alignment layer have different polarities such that pre-tilt angles and orientations of liquid crystal molecules on the reflective region and on the transmissive region are different.

8. The method as claimed in claim 7, wherein a polarity of the first alignment layer is opposite to the polarity of the second alignment layer.

9. The method as claimed in claim 7, wherein the first alignment layer and the second alignment layer comprise polyvinyl alcohol (PVA), polyimide (PI), polyamide (PA), polyurea (PU), nylon, or lecithin.

10. The method as claimed in claim 7, wherein the first alignment layer is formed by roller coating, spin coating, spraying, or inkjet printing on the first substrate.

11. The method as claimed in claim 10, after the first alignment layer is formed on the first substrate, further comprising a soft baking procedure and a hard baking procedure.

12. The method as claimed in claim 7, wherein the second alignment layer is formed by spraying, or inkjet printing on the first alignment layer.

13. The method as claimed in claim 12, after the second alignment layer is formed on the first alignment layer, further comprising a soft baking procedure and a hard baking procedure.

14. The method as claimed in claim 7, wherein the first alignment layer provides a vertical liquid crystal molecule orientation and the second alignment layer provides a horizontal liquid crystal molecule orientation, or wherein the first alignment layer provides a horizontal liquid crystal molecule orientation and the second alignment layer provides a vertical liquid crystal molecule orientation.

* * * * *